Aug. 17, 1948.   H. A. RUSH   2,447,031
LIQUID DOSING APPARATUS
Filed Dec. 8, 1944   2 Sheets-Sheet 1
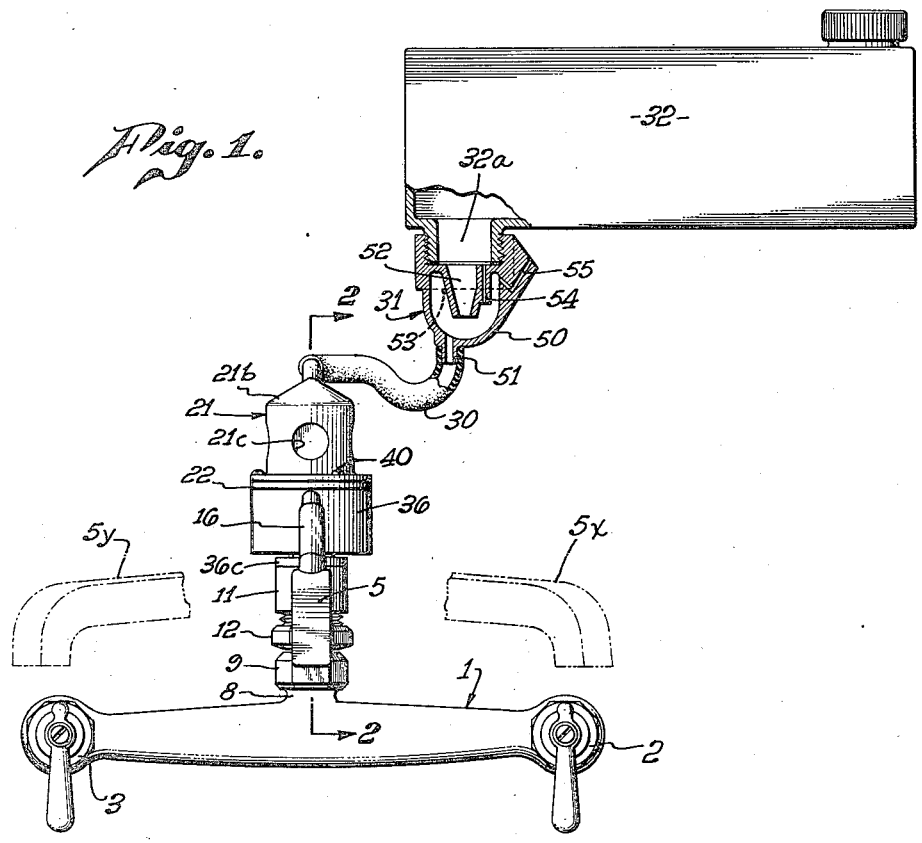
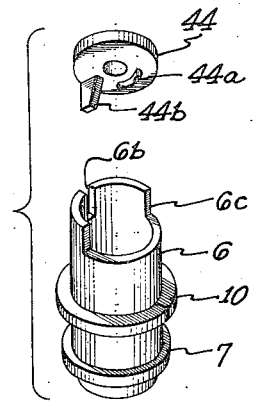
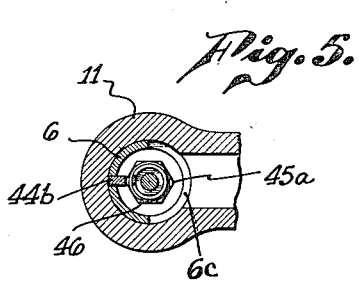
HARRY A. RUSH,
INVENTOR.
BY
ATTORNEY.

Aug. 17, 1948.  H. A. RUSH  2,447,031
LIQUID DOSING APPARATUS
Filed Dec. 8, 1944  2 Sheets-Sheet 2

HARRY A. RUSH, INVENTOR.

BY ATTORNEY.

Patented Aug. 17, 1948

2,447,031

UNITED STATES PATENT OFFICE 2,447,031

LIQUID DOSING APPARATUS

Harry A. Rush, Glendale, Calif.

Application December 8, 1944, Serial No. 567,173

12 Claims. (Cl. 210—31)

1

This invention relates to apparatus for mixing liquid chemical and water; more particularly it relates to such apparatus wherein chemical is caused to be delivered in appropriate quantities and mixed with water discharged by a tap or faucet.

It is often desirable to provide successive quantities of chemically treated water for various uses, such as cleansing or disinfecting, for which purpose water is often dosed with a predetermined proportion of an oxidizing agent, such for example, as chlorine. It is convenient to have a faucet or tap which delivers water so arranged that, as the water is drawn, an appropriate amount of chemical is supplied and mixed with the water automatically.

Further, it is often desirable to obtain clear untreated water from the source tap, for instance for use as rinse. Thus, it is preferred to have the tap or faucet so arranged that it may be operated readily to obtain untreated water or water mixed with chemical, as desired. For this purpose, it is convenient to provide a pair of water containers placed closely side by side, one container being for clear water and the other for the mixture. The containers are arranged to receive water from a common faucet provided, as is well known, with a swing spout by which the faucet discharge may be optionally directed into either container.

It is an object of this invention to provide a chemical dosing device adapted for use with a swing spout faucet, and in which the chemical treatment is controlled in accordance with the position of the spout. Thus, in one position of the spout, untreated water will be delivered to one of the containers while in another position a mixture of chemical and water in predetermined proportions will be delivered to the other container.

It is another object of this invention to provide such a device which is simple and compact, and has a pleasing appearance.

It is another object of this invention to provide such a device which accurately controls the chemical dosage of the water.

It is another object of this invention to provide such a device which insures against escape or leakage of the chemical.

It is another object of this invention to provide such a device wherein the discharge of the chemical to be mixed is accurately controlled in accordance with the volume of water delivered.

It it another object of this invention to provide such a device in which the discharge of the chemical is controlled by a valve arranged to be opened by pressure of the water being delivered.

It is another object of this invention to provide such a device employing a novel form of valve operated by movement of the swing spout, so that throughout a predetermined range of positions of the swing spout, the pressure of the water being delivered by the spout is effective to cause chemical treatment of the water, while for positions of the spout outside of this range, the water pressure has no such effect.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

In the accompanying drawings:

Figure 1 is an elevation, somewhat diagrammatic, showing the apparatus arranged for use;

Figure 2:
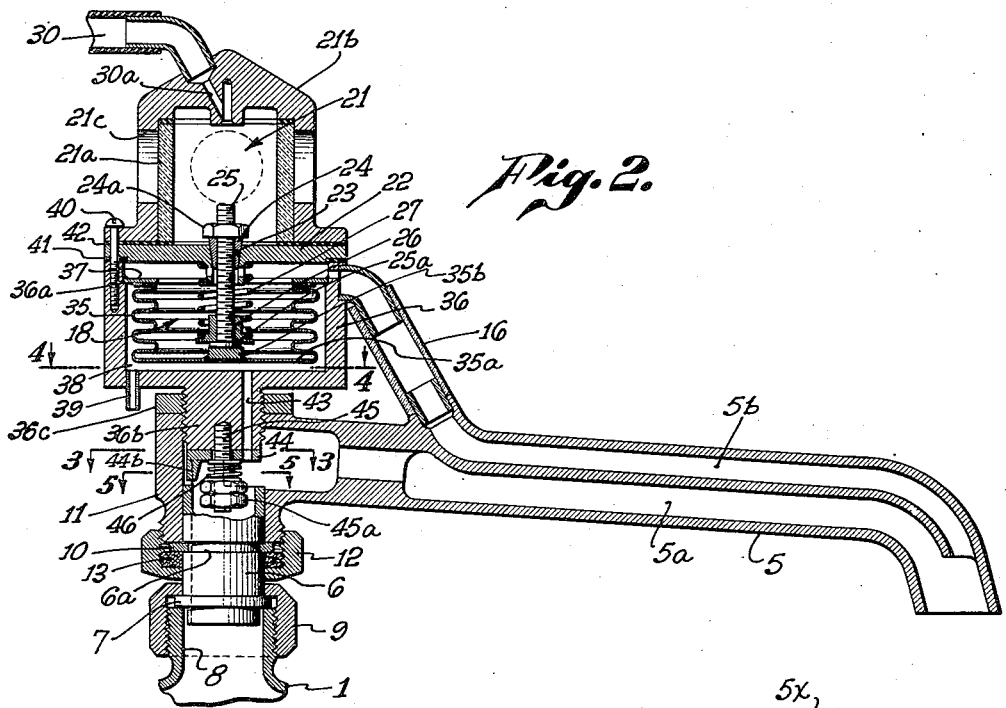
Figure 2 is a section on an enlarged scale taken on line 2—2 of Figure 1.
Figure 4:
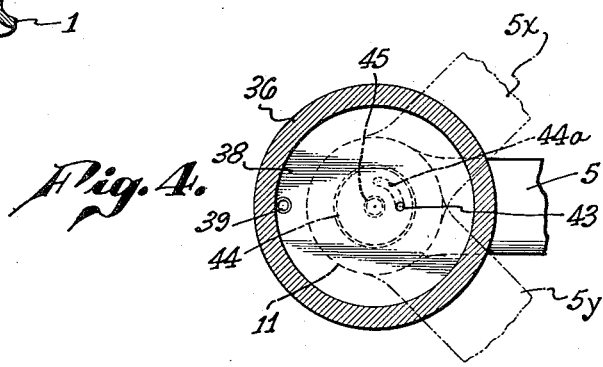
Figure 3:
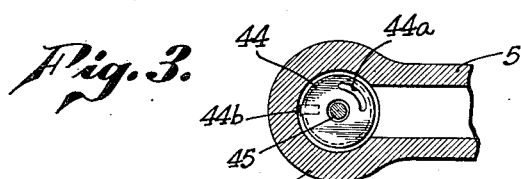

Figures 3, 4, and 5 are cross sections taken on the correspondingly numbered lines of Figure 2; and, Figure 6 is an exploded pictorial view of certain elements of the device.

Referring to Figures 1 and 2 of the drawings, a manifold such as is commonly used with swing spout faucets is indicated by 1 and has hot and cold water valves 2 and 3 at its opposite ends for controlling the discharge of water in the usual manner. A spout 5 for leading the discharge from the manifold in a desired direction, and of special design, is swingably mounted on the manifold 1. For this purpose a tubular extension 6 having an annular flange 7 near its lower end is clamped against the outlet nozzle 8 of the manifold 1 by a nut 9. A second flange spaced above the flange 7 is formed on the extension 6 by a split ring 10 engaging a recess 6—a in the extension. The spout 5 has a hub 11 which rotatably embraces the extension 6 and is supported thereon by the flange or ring 10. A nut 12 threadedly engages the lower end of the hub 11 and by engaging the under side of the ring 10, secures the spout 5 rotatably on the extension 6. A suitable stop (not shown) may be provided to appropriately limit the angular movement of the spout 5 about the extension 6. The nuts 9 and 12 are first placed on the extension, after which the ring 10 is assembled in the groove 6—a. The hub 11 is then placed on the extension 6 and the nut 12 threaded thereon to restrain the hub axially. Suitable packing 13 is provided between the nut 12 and the ring 10 to prevent leakage.

The spout 5 has a main discharge passage 5—a for water, arranged to be in continuous communication with the manifold 1 through the extension 6, and a supplemental discharge passage 5—b for the chemical. This supplemental passage 5—b is connected by a short conduit 16 with the interior of a chamber 18, which in turn is adapted to be in communication with an air trap 21 by means of a valved port 23 in a wall 22 separating the chamber 18 and the trap 21. The trap 21 is connected with a small elevated tank 32 containing the chemical (see Figure 1) by a flexible conduit 30. A device 31 for delivering the liquid chemical to the trap 21 under a constant pressure head may be interposed in the conduit 30 if desired, and will be referred to in more detail later.

The chemical receiving chamber 18 is formed by a metallic bellows or Sylphon 35 mounted in a housing 36. The upper end of the Sylphon 35 is open and is attached to a ring 37 which is secured on a shoulder 36—a in the housing 36, as by soldering. The housing 36 has a lower reduced threaded extension 36—b by means of which the housing is secured in the upper end of the hub 11 of the spout 5, a nut 36—c serving to secure the parts in adjusted relationship. The lower end of the Sylphon is closed by a wall 35—a spaced above the bottom of the housing 36, the Sylphon thus cooperating with the housing to form an expansible chamber 38. The chamber 38 is continuously vented to the atmosphere by a small drain port 39, and is arranged to be supplied with water under pressure from the manifold 1 in a manner to be presently described.

The dividing wall 22 is mounted on top of the housing 36, and the trap 21 is mounted on the wall 22, the trap and wall being secured in assembled relationship on the housing by screws 40, suitable gaskets 41 and 42 being provided to prevent leakage.

The trap 21 is formed of a tubular glass member 21—a mounted within a casing 21—b, having openings 21—c through which the interior of the trap 21 may be inspected. The conduit 30 is in constant communication with the interior of the trap 21 through a small port 30—a. The port 23 by which the trap 21 communicates with the chamber 18 is closed by a tapered closure member 24 threadedly secured on a valve stem 25 having a head 25—a. A ferrule 26 seats on the head 25—a and confines a light compression spring 27 against the wall 22. The spring urges the member 24 to close the port 23. The bellows 35 carries a pad 35—b on its bottom wall 35—a, which is engageable with the stem head 25—a. Upon creation of suitable pressure in the chamber 38, the bellows 35 will contract and unseat the closure 24 against the force of the spring 27; upon removal of such pressure, the spring 27 seats the closure 24, and the bellows due to its natural resilience, expands to its original size.

Means are provided whereby the pressure of the water delivered by the spout 5 may be caused to open the port 23. Thus, a port 43 is provided in the hub 36—b extending from the chamber 38 to the interior of the hub 11. A valve plate 44 having an arcuate opening 44—a (Figures 3 and 6) for cooperating with the port 43, is rotatably secured on the lower end face of the hub 36—b, as by a stud 45 tapped into the hub 36—b and having nuts 45—a threaded thereon. A light compression spring 46 confined between the uppermost of the nuts 45—a and the plate 44 serves to resiliently maintain the plate 44 against the face of the hub. As clearly shown in Figures 2, 5 and 6, the plate 44 has a depending lug 44—b which, by engagement with a slot 6—b in the upper end of the tubular extension 6, holds the plate 44 against rotation. At the same time, the plate 44 is free to move axially into contact with the lower end of the hub 36—b in response to the spring 46. As clearly shown in these figures, the upper end portion of the tubular extension 6 has a cut away portion 6—c of substantial angular extent, so that the passage 5—a of the spout 5 will be in free communication with the extension 6 and hence with the manifold 1 for any adjusted position of the spout.

The arrangement of the parts is such (referring to Figures 1 and 4), that with the spout 5 to the right of its mid-position, as indicated by 5—x, the port 43 will align with the slot 44—a, placing the chamber 38 in communication with the manifold 1. Thus, if either or both of the faucets 2 and 3 are discharging water, such water will enter the chamber 38 and build up pressure therein due to the friction head of the water in the passageway 5—a. This pressure partially collapses the bellows 35 and unseats the valve closure 24. For this to occur it will be obvious that the port 39 must be capable of discharging at a rate less than the rate of supply through the port 43. If the spout 5 is to the left of its mid-position as indicated by 5—y, the port 43 will be closed by the plate 44, so that no water can enter the chamber 38. By virtue of the port 39, no water will be trapped in the chamber 38, possibly holding the valve closure 24 unseated, in the event the spout 5 is swung from a position, as 5—x, with port 43 open, to a position closing the port 43 while either of the faucets 2 or 3 is open.

The unseating of the valve closure 24 allows chemical to pass from the trap 21 to the chamber 18, from whence it is drawn through the passage 5—b by the water discharging from the passage 5—a, the chemical mixing with the water as it discharges. The proportions of the mixture are quite constant, since the volume of water discharged by the spout 5 depends on the velocity of the water and hence on its pressure, and the extent to which the closure 24 is unseated likewise depends on the water pressure. The proportions of the mixture may be altered by adjusting the tension of the spring 27, which varies the amount of opening provided by the closure 24 for a given water pressure. This adjustment is readily accomplished, by relative rotation of the closure 24 on the threaded stem 25 to alter the effective length of the stem. A nut 24—a serves to maintain the parts in adjusted relation.

To assist in closely maintaining the mixture of the desired proportions, it may be desirable to arrange that the liquid chemical is supplied under a substantially constant head, regardless of whether the container 32 be quite full or nearly empty. For this purpose, a device such as indicated at 31 (Figure 1), and disclosed in U. S. Patent Number 1,844,342, issued to P. Berman, February 9, 1932, and entitled "Bottle nozzle," has been found suitable. This device comprises an auxiliary reservoir or closed cup 50, adapted to be threaded on the container outlet 32—a and having an outlet nozzle 51 to which the conduit 30 is connected. Liquid enters the cup 50 through the nozzle 52 to about the level 53 which closes the air inlet port 54. As this is the only means admitting air to the container 32, no more liquid will be discharged from the container. Upon withdrawal of liquid from the cup 50, this port 54 will be uncovered, allowing air to enter the container 32 via the port 55, the space in the cup 50 above the liquid, and the port 54. This will allow liquid to flow from the container 32 into the cup 50. In this connection it is to be noted that the amount of chemical withdrawn to meet the requirements of the discharge of the spout 5 is small, hence when liquid is being withdrawn from the cup 50, the liquid level 53 drops to some point slightly below the lower end of the port 54, establishing a balanced condition where the amount of liquid withdrawn is exactly equalled by the amount of air admitted to the container 32.

I claim:

1. In a chemical dosing apparatus, swingable spout means forming a passage for passing water under pressure, means for feeding chemical to said water, pressure responsive valve means for controlling said chemical feed, and means for causing the pressure of said water to operate said valve means in accordance with the position of said swingable spout means.

2. In liquid dosing apparatus, swingable spout means forming a passage for passing a first liquid under pressure, a source adapted to pass a second liquid to said first liquid, valve means for the passing of said second liquid from said source, means forming an expansible chamber for causing said valve means to open in response to an increase in volume of the chamber, means urging said valve means to close, and control means optionally connecting said passage and said chamber to actuate said valve means.

3. In liquid dosing apparatus, means forming a passage for passing a first liquid under pressure, means for feeding a second liquid to said first liquid, valve means for controlling said second liquid feed, means forming an expansible chamber for causing said valve means to open in response to an increase in volume of the chamber, means urging said valve means to close, control means optionally admitting said first liquid under pressure from said passage to said chamber to cause said valve means to open, and means forming a constantly open vent from said chamber to release the pressure in said chamber upon closure of the control means, to permit said valve means to close.

4. In liquid dosing apparatus, means forming a spout for discharging a first liquid under pressure and optionally movable to desirably direct the discharge, means for feeding a second liquid to said first liquid, means including a movable wall, forming an expansible chamber, a valve for controlling said feed means and arranged to be opened in response to the movement of said wall, and means responsive to the positioning of said spout for applying said first liquid under pressure to said chamber to control the position of said wall.

5. In liquid dosing apparatus, means forming a spout for discharging a first liquid under pressure and optionally movable to desirably direct the discharge, means for feeding a second liquid to said first liquid, pressure operated valve means for controlling said feed, and means responsive to movement of said spout for supplying the pressure of said first liquid to said valve means in accordance with the position of the spout.

6. In liquid dosing apparatus, means forming a housing, a flexible member cooperating with said housing to form an expansible chamber on one side of the member and a liquid receiving chamber on the other side, means for admitting liquid to said liquid chamber in accordance with the movement of said member, means comprising a constantly open port, for discharging liquid from said liquid chamber, and means including a valve for optionally applying fluid pressure to the expansion chamber to control the position of said member.

7. In liquid dosing apparatus, means forming a housing, a flexible member dividing said housing into an expansible chamber and a liquid receiving chamber, means for feeding liquid to said liquid chamber in accordance with the position of said member, means forming an outlet from said liquid chamber, there being a port in said housing communicating with said expansion chamber, a closure member for said port, restrained against rotation, said housing being supported for rotary movement, said port being spaced radially from the axis of rotation of the housing, means for rotating said housing to cause said closure to open and to close the port, and means adapted to apply an operating fluid under pressure to said chamber through said port.

8. In liquid dosing apparatus, a spout for discharging a first liquid under pressure and supported for optional movement to desirably direct the discharge, a source of supply of a second liquid, pressure responsive means for controlling the passage of said second liquid to the first liquid including an expansible chamber, a port communicating with said chamber and movable with said spout, and a stationary closure for said port, whereby passage of said second liquid to the first liquid is controlled in accordance with the position of the spout.

9. In liquid dosing apparatus, a swingably supported spout adapted to discharge a first liquid under pressure, a second liquid receiving chamber on said spout, means supplying said second liquid to said chamber, pressure operated means for controlling the admission of said second liquid to said chamber, a conduit leading from said chamber to said spout, and means, responsive to positioning of the spout within predetermined limits, for diverting a portion of said first liquid to operate said control means.

10. In liquid treating apparatus, a spout adapted to discharge a first liquid under pressure, means swingably supporting said spout, means on said spout adapted to receive a second liquid, means including a control valve for feeding said second liquid from said receiving means to said first liquid as it is discharged, means including a movable wall forming an expansible chamber on said spout for operating said valve, and means responsive to movement of the spout for diverting said first liquid under pressure from said spout to said chamber to cause said wall to operate the valve, and for discharging said first liquid from said chamber, in accordance with pressure conditions in said spout.

11. In liquid treating apparatus, a spout adapted to discharge a first liquid under pressure, means swingably supporting said spout, means on said spout adapted to receive a second liquid, means including a control valve for feeding said second liquid from said receiving means to said first liquid as it is discharged, means forming an expansible chamber on said spout for operating said valve, conduit means connecting said chamber and said spout and having a port therein, and a closure member for said port stationarily supported with respect to said spout, whereby swinging of the spout acts to open and close said port to cause said control valve to feed said second liquid in accordance with the position of the spout.

12. In liquid dosing apparatus, a housing, a flexible member dividing said housing into an expansible chamber and a liquid receiving chamber, a spout mounted on said housing and having an outlet and a pair of passages therein each passage being connected to said outlet, means for feeding liquid to said liquid receiving chamber in accordance with the position of said flexible member, conduit means connecting said liquid receiving chamber and one of said spout passages, conduit means for applying liquid to said other spout passage, conduit means connecting said expansion chamber and said other spout passage and having a port therein, a closure member for said port, said housing being supported for rotary movement with respect to said closure member, said port being spaced radially from the axis of rotation of said housing, said housing when rotated with respect to said closure member causing opening and closing of said port by said closure member.

HARRY A. RUSH.

REFERENCES CITED

The following references are of record in the file of this patent:

UNITED STATES PATENTS

| Number | Name | Date |
|---|---|---|
| 1,044,653 | Held | Nov. 19, 1912 |
| 1,185,626 | Brown et al. | June 6, 1916 |
| 1,720,326 | Halstead et al. | July 9, 1929 |
| 1,897,492 | Ledoux | Feb. 14, 1933 |
| 1,905,244 | Rohlin | Apr. 25, 1933 |
| 1,943,487 | Ruth | Jan. 16, 1934 |
| 1,949,934 | Fulton | Mar. 6, 1934 |
| 2,049,530 | Van Eweyk | Aug. 4, 1936 |
| 2,128,721 | Watts | Aug. 30, 1938 |
| 2,224,101 | Hegwein | Dec. 3, 1940 |
| 2,302,097 | Beckman | Nov. 17, 1942 |

FOREIGN PATENTS

| Number | Country | Date |
|---|---|---|
| 370,842 | Great Britain | Feb. 14, 1932 |
| 382,646 | Great Britain | Oct. 24, 1932 |